W. J. WALSH.
GAMBREL.
APPLICATION FILED NOV. 3, 1913.
1,107,467.
Patented Aug. 18, 1914.
Fig. 1.
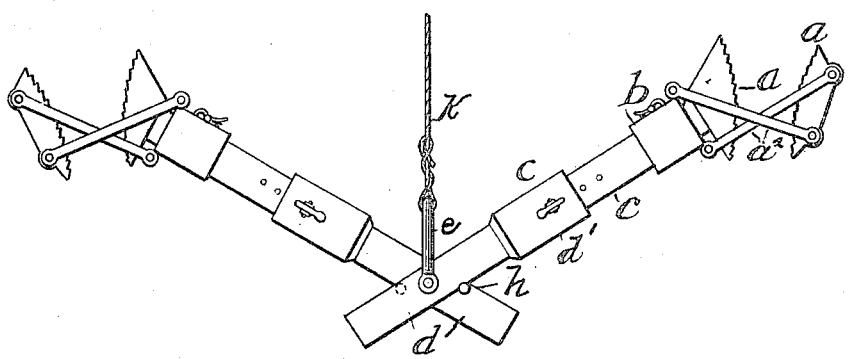
Fig. 2.
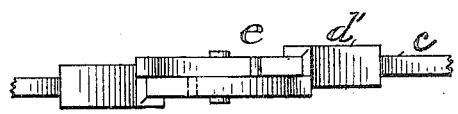
Fig. 3.
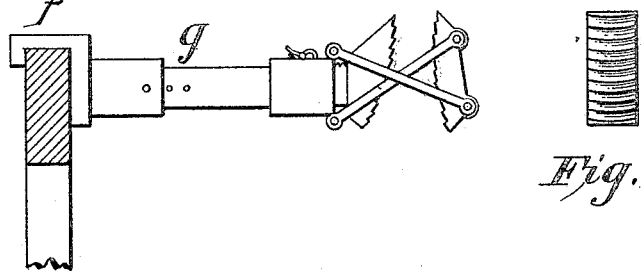
Fig. 4.
Witnesses:
Inventor:
William J. Walsh

UNITED STATES PATENT OFFICE.

WILLIAM J. WALSH, OF CRESTON, IOWA.

GAMBREL.

1,107,467.  Specification of Letters Patent.  Patented Aug. 18, 1914.

Application filed November 3, 1913. Serial No. 799,042.

*To all whom it may concern:*

Be it known that I, WILLIAM J. WALSH, a citizen of the United States, residing at Creston, in the county of Union and State of Iowa, have invented new and useful Improvements in Gambrels, of which the following is a specification.

My invention relates to improvements in meat spreading devices and consists in the combination and arrangement of parts as hereinafter set forth and claimed.

In the accompanying drawings, which form a part hereof, similar letters designate like parts, and Figure 1, is a side view of the device as embodied in my invention. Fig. 2, is a top or plan view of a part of the device shown in Fig. 1. Fig. 3, is a view showing one of the arms with a bracket for supporting it. Fig. 4, is a face view of one of the holding jaws which engage the limb of the suspended carcass.

The device as shown consists of two main arms $d$, each of which has at its outer end a socket $d'$, adapted to adjustably receive a stem $c$, on which is slidably mounted a sleeve $b$. Secured to the stem $c$ is a fixed jaw $a$; and a movable jaw $a'$ is connected by a pair of links $a^2$ to the stem $c$, and sleeve $b$, respectively, so that as the sleeve $b$ is moved on said stem the movable jaw $a'$ is brought either to or from the fixed jaw so as to either grasp or release the portion of the carcass held thereby. The stem $c$ is adjustably held as shown in the socket $d'$ by means of a pin secured to the wall thereof and passing through an opening therein into either one of a series of openings in said stem. Similar locking holds the sleeve $b$, in its adjusted position on the stem. A clevis is pivotally connected with the inner ends of the arms $d, d$, by means of a bolt held in openings in said ends, and to said clevis is attached a rope or cable $k$ for holding the gambrel in elevated position. On each of the arms $d$, is a pin $h$, which serves as a stop preventing the falling of the outer ends of the arms, thus aiding in their extension. Fig. 3, is a modification showing a single holding arm secured by the bracket $g$ to a support.

From the description the manner of operating the device is readily apparent and needs no further explanation. Its simplicity of construction and adaptability for the purpose intended is readily seen.

Having thus described the device, what I desire to obtain and secure by Letters Patent is:

1. A device for the purpose set forth consisting of a pair of pivotally connected arms each having a stem adjustably connected therewith and provided at its outer end with a fixed jaw, and a co-acting movable jaw with means secured thereto and movable on said stem for operating it.

2. A device for the purpose set forth, consisting of a pair of pivotally connected arms each having a stem adjustably connected therewith and provided with a fixed jaw; a coacting movable jaw having operating means movable on said stem and means pivotally connected with the inner end of said arms, for suspending the same, said inner ends having pins forming stops for the purpose set forth.

In presence of two witnesses I affix my signature.

WILLIAM J. WALSH.

Witnesses:
 E. N. DOUGHERTY,
 W. F. BUSLEY.

---

Copies of this patent may be obtained for five cents each, by addressing the "Commissioner of Patents, Washington, D. C."